Sept. 30, 1947. M. CONSTANT 2,428,146
APPARATUS FOR SEPARATING FINE GOLD BY SCREENING AND AQUEOUS SUSPENSION
Filed April 2, 1945 2 Sheets-Sheet 1
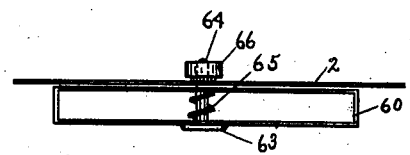
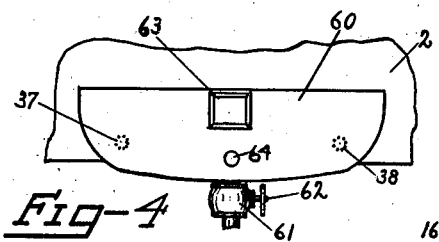
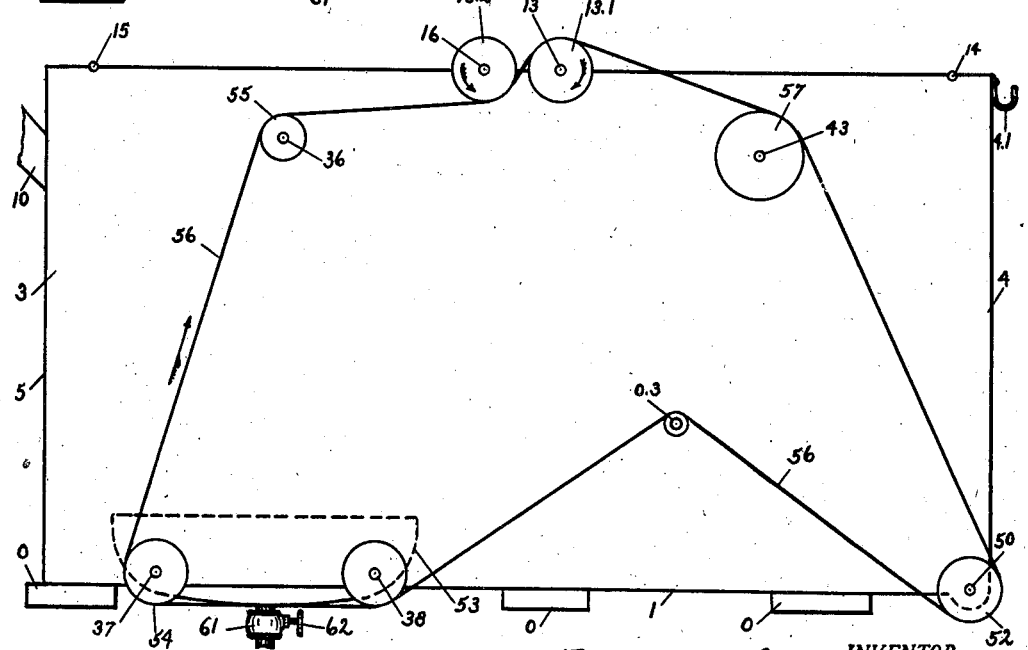

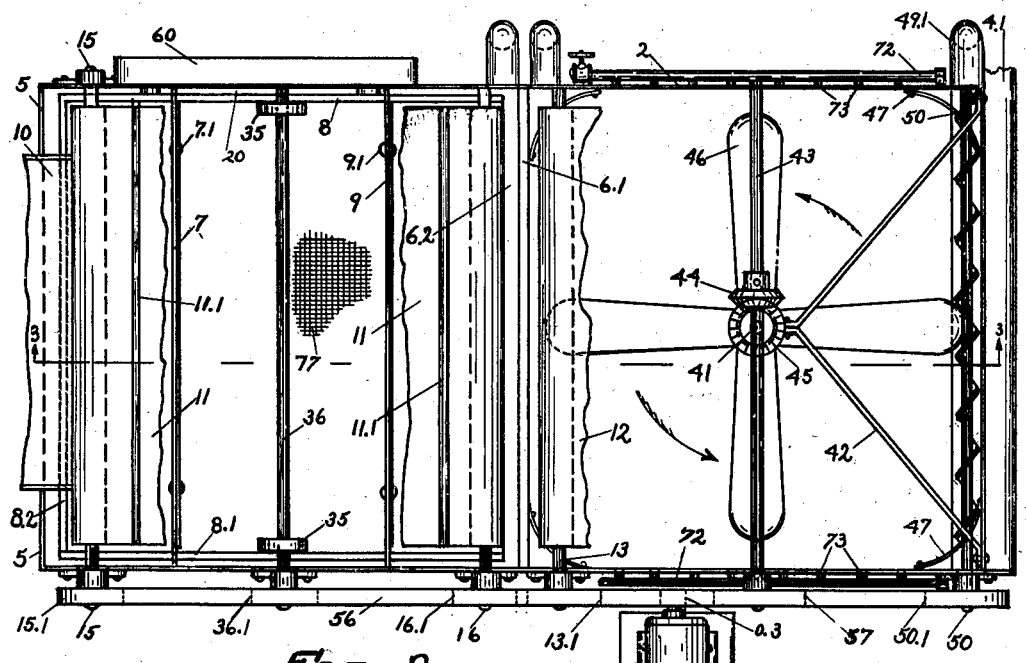
Fig-2
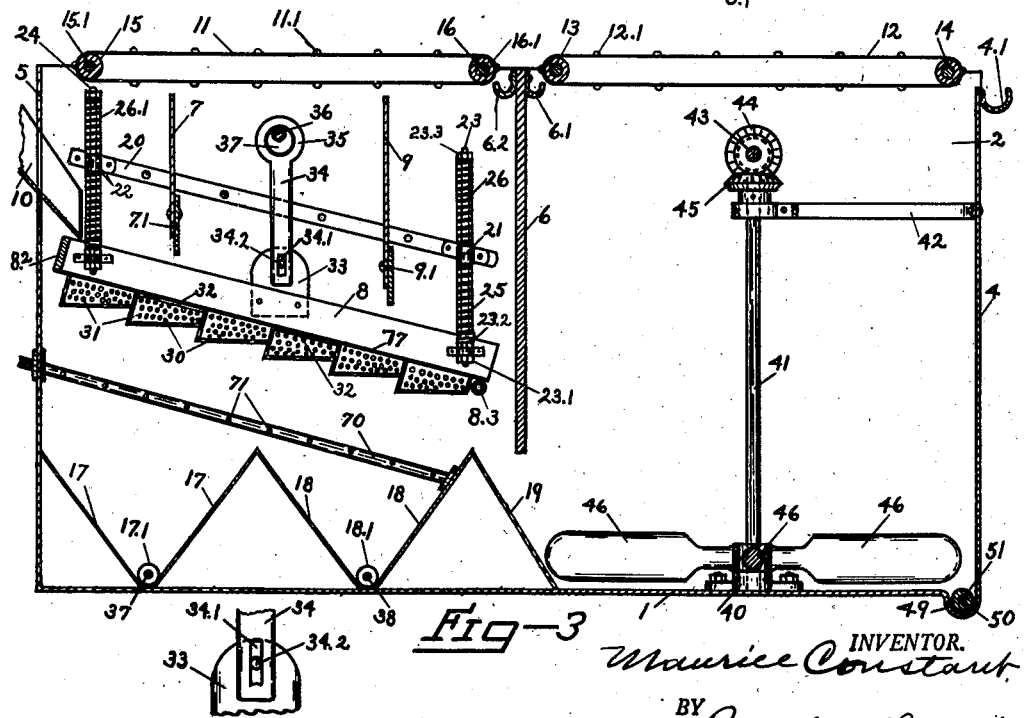
Fig-3
Fig-6
INVENTOR.
Maurice Constant
BY Bush-Bush,
His Attorneys.

Patented Sept. 30, 1947

2,428,146

UNITED STATES PATENT OFFICE 2,428,146

APPARATUS FOR SEPARATING FINE GOLD BY SCREENING AND AQUEOUS SUSPENSION

Maurice Constant, Reno, Nev.

Application April 2, 1945, Serial No. 586,149

15 Claims. (Cl. 209—17)

My invention relates to an improvement in apparatus for separating fine gold and other minerals from placer ground, crushed rock and similar materials and the objects of my invention are to provide improved means for separating and classifying the fine minerals and mineral-bearing particles from the waste matter in placer ground, crushed ore-bearing rock, etc., including both the sinkable elements and the floatable elements, such as flour gold or other elements which may be made floatable by the addition of oil or similar material to the pulp or feed, and providing means for drawing off the values both at the bottom and at the surface of the water. In my copending application Serial No. 617,473 I claim a process carried out in this apparatus.

I accomplish these objects by the means illustrated in the accompanying drawings, in which, Figure 1 is a side elevation of my apparatus;

Figure 2 is a plan view, but with parts of the rakes omitted and the screen shown only in part;

Figure 3 is a sectional elevation on the line 3—3 of Figure 2;

Figure 4 is a detail of the discharge chamber;

Figure 5 is a detail of the discharge chamber from above but omitting the top plate;

Figure 6 is an enlarged detail of the lower end of a connecting rod.

Similar numerals refer to similar parts throughout the several views.

My apparatus comprises a tank having a bottom 1, side plates 2 and 3 and end plates 4 and 5. The tank may rest upon blocks 0—0—0 or any suitable foundation. At the middle of the tank a transverse partition 6 is arranged extending downwardly from the top of the tank but leaving a space at the bottom of the partition for the passage of water, etc.

At the feed end of the tank a chute 10 is provided for the introduction of the placer ground, pulp, or other material to be screened.

The end plate 4 at the discharge end of the tank extends upward to the desired water level somewhat below the top of the tank and a trough 4.1 is provided to carry off the discharge waste and water accompanying it.

In the bottom of the tank at the feed end I provide a plurality of V-shaped troughs 17 and 18 with rounded bottoms in which are mounted shafts 37 and 38 extending through the sides of the tank through suitable bearings secured therein. Upon the shafts 37 and 38 I mount spiral conveyor blades 17.1 and 18.1 which are actuated by the pulleys 54 and 53 mounted upon the shafts 37 and 38 outside of the tank. The discharge ends of the conveyors extend through suitable openings in the side plate 2 into a discharge chamber 60 mounted upon one side of the tank near the bottom thereof. The discharge chamber 60 has a discharge pipe 61 secured in the bottom thereof which may be closed by a suitable gate valve manually operated by the valve handle 62. This gate or door may be of any desired form and I make no claim to any particular type of valve. A shaft 64 with pulley 66 mounted thereon is mounted in the sidewalls of the chamber and carries a spiral conveyor 65 to assist in discharging the chamber.

The outer wall of the discharge chamber 60 may be provided with a sight-glass 63 through which the content of the chamber may be observed to assist in determining when the discharge valve should be opened or closed.

In the bottom of the tank at the discharge end I form a trough 49 preferably formed integral with the bottom and end of the tank in which a spiral conveyor 51 may be mounted upon a shaft 50 with pulley 52 and provided with a discharge chamber 49.1 which may be provided with a discharge valve of any desired form or type.

In the feed end of the tank I mount a primary screen 77 preferably of from one-eighth to five-eighths inch mesh which may be soldered or otherwise suitably secured to a screen frame having side bars 8 and 8.1 of angleiron or other suitable material, with an end bar 8.2 at the upper end and with the lower end supported by a crossbar 8.3.

Underneath the primary screen I mount a secondary screen of suitable screen wire or other material extending the full length and width of the primary screen, but with transverse pockets 30 formed therein which extend the full width of the screen.

These pockets are preferably filled with coarse granular material which may consist of shot 31, metal balls, small pebbles or similar material. The openings between the shot or balls will permit fine gold, black sand or other metal or mineral particles to descend to and through the bottom of the pockets 30 and thus drop into the troughs 17 and 18, while the flour gold or other fine or light minerals may pass upwardly, being aided by an upward flow of water produced by the water pipe 70.

Plates 32 may be placed above the shot or balls in alternate pockets in order to further promote the separation of the heavy materials from the light and give a somewhat richer concentrate in the troughs.

The screen frame may be suspended by rods 23 and 24 united to the sidebars near the ends thereof at the opposite sides of the screen. These bars may extend upwardly through suitable sleeve-bearing brackets 21 and 22 mounted upon diagonal bars 20 secured to the inside of the side plates of the tank by rivets or other suitable means.

Upon the rods 23 I mount between the lower end of the sidebars 8 and the sleeve-brackets 21 coiled compression springs 25 which bear downwardly against the screen sidebar 8 and upwardly against the brackets 21. The lower ends of the rods 23 are adjustably secured to the sidebars with adjusting nuts 23.1 and 23.2. The upper end of the springs 25 bear against the brackets 21.

Above the brackets 21 I mount on the rods 23 corresponding springs 26 similar to the springs 25 which bear downwardly against the brackets 21 and upwardly against the nut 23.3 threaded upon the rod 23. By means of the adjusting nuts, the tension of the springs above and below the bracket 21 may be equalized.

Corresponding springs 26.1, similarly mounted, are secured upon the rods 24 at the feed end of the screen and are adjustable and operate in a similar manner.

To the sidebars 8 and 8.1 I rivet plates 33 extending upwardly and in which pins 34.2 are rigidly mounted. Connecting rods 34 have their lower ends provided with slots 34.1 through which the pins 34.2 extend and which allow a limited amount of play.

The upper ends of the connecting rods 34 are provided with circular heads or bands 35 which surround and may be actuated by eccentrics 37 mounted upon the shaft 36 which is mounted in suitable bearings in the side plates 2 and 3 and extends transversely of the tank from side to side.

Similar eccentrics, connecting rods, etc. are provided for both sides of the screen and if desired, such connecting rods, eccentrics, etc. may be provided at both ends of the screen instead of a single pair at the middle as shown.

Water may be added to the placer ground in the chute 10 before it reaches the screen and the tank may be prefilled to the desired level before the placer ground is fed to the tank.

One or more feed water pipes 70 may extend into the tank through the feed end and be secured to one side of the trough 18 or otherwise as desired, and may be provided with a plurality of openings 71 at both sides thereof and if desired, may be utilized to force compressed air into the tank either with the water or separately therefrom and may also be used to carry any oil or chemicals desired to aid the separation process.

In order to prevent eddies and to slow down the current of water in the tank, I provide a plurality of baffles 7 and 9 which extend transversely of the tank from the water level down to a point above the primary screen and these baffles may be provided with adjustable sections 7.1 and 9.1 by which the height of the lower end may be adjusted.

To carry off float or flour gold or other light minerals from above the screen, I provide a rake comprising an apron or web-belt 11 carrying transverse bars or blades 11.1 arranged to rake the surface of the water and carry the float thereon to the discharge trough 6.2 which is rigidly secured to the partition 6. The apron 11 is carried on drums 15.1—16.1 on shafts 15 and 16. The shaft 16 carries a pulley 16.2 on one end thereof to drive it.

When the water and pulp leave the primary screen, they pass under the lower end of the partition 6 and into the discharge end of the tank.

In the discharge end of the tank, I mount a shaft 41 with its lower ends secured in a suitable bearing 40 united to the bottom plate 1 of the tank and its upper end held in place by arms 42 the ends of which are welded or otherwise suitably secured to the end plate 4 of the tank.

The middle portion of the bars 42 may form a circle which carries a suitable bearing for the upper part of the shaft 41. Upon the upper end of the shaft 41 I mount a bevel gear 45 which meshes with a corresponding bevel gear 44 mounted upon a transverse shaft 43 the ends of which extend outwardly through the sides of the tank through suitable bearings of any desired type. At the lower end of the shaft 41 above the bearing 40, I mount a multiple-bladed propeller with blades 46 arranged to revolve with the shaft and to impel the water and waste upwardly through that end of the tank.

Just above the water level in the discharge end of the tank I provide a rake having a belt or apron 12 carrying transverse bars 12.1 and driven by drums mounted upon the shafts 13 and 14 which extend transversely of the tank. The shaft 13 carries upon one end the drive pulley 13.1. This rake carries the float from the discharge end to the discharge trough 6.1 from which it may be discharged into any suitable receptacle.

On the outer sides of the discharge end of the tank just above the bottom of the tank, I mount water mains 72 with short pipes 73 united thereto and extending into the tank through the side plates thereof so that additional water or air or oil or chemicals may be added to the fluid therein through the pipes 72 and 73.

Vertical curved plates 47 are fitted in the corners of the feed end of the tank and may extend down to the floor of the tank at the feed end but not below the lower end of the partition where they are adjacent to that partition.

These curved plates correspond roughly to the line of travel of the ends of the propeller blades 46 and tend to improve the movement of the waste up to the discharge level.

The various shafts may be driven by sprocket wheels and chains or by a belt or belts or any suitable means but I have shown in Figure 1 a belt driven by a wheel 0.3 on the motor shaft of the motor 0.2 secured on a base 0.1 to one of the foundation blocks 0, with different size pulleys upon the various shafts so as to give the proper differential speed to the various moving parts.

It is obvious that the screen shaker shaft will need to travel more or less rapidly than the propeller shaft or the discharge shafts and the sprocket wheels or pulleys on the different shafts may be varied as necessary to procure the proper differentials in speed.

In the operation of my apparatus, the placer ground or pulp is fed into the chute 10 by any desired feeding apparatus or from a storage bin by gravity or otherwise as desired and in either wet or dry form. The tank is preferably filled with water before the introduction of any of the placer material and additional water is fed into the tank through the feed water pipes 70 and 72 as necessary to maintain the water level at approximately the height of the discharge trough 4.1.

As the placer ground descends, it falls upon the primary screen which, being agitated vertically by the screen shakers, causes the heavy and light particles to readily separate and the heavy particles of gold, black sand, or other minerals, etc. to pass through the secondary screen down to the discharge troughs to be carried out by the spiral conveyors. Most of the lighter material will pass downwardly over the primary screen and over the plate 19 into the discharge end of the tank, carrying with it any large nuggets or pieces of gold or other pieces of metal or minerals too large to pass through the screen and such pieces are carried around by the propeller 46 into the discharge trough 49 from which they are discharged by the spiral conveyor therein.

The extremely fine gold in the form of flour gold or any other metals or minerals which are floatable, are carried to the surface over the screen and thence impelled by the rake to the discharge trough 6.2.

Floatable particles which may be carried beyond the partition 6 are carried upwardly by the upwardly moving current of water to the surface where they are raked off by the rake 12 into the discharge trough 6.1.

The waste sands and rocks are driven upwardly with the water by the propeller 46 and discharged into the discharge trough 4.1 and from thence led to a tailing pond or any other suitable place of deposition.

It is obvious that the sizes, proportions and arrangements of parts of my apparatus may be varied to suit the different types of material on which it is sought to operate, without departing from the spirit of my invention and I do not limit my claims to the precise forms shown in the drawings, which are to be regarded as illustrative rather than critical.

I claim:

1. A metals and minerals separating and classifying machine comprising a fluid-containing tank with a constant fluid level of approximately 4½ feet, a submerged screen frame extending longitudinally in the tank and sloping downwardly from the feed end at a depth of approximately 1½ to 2½ feet below the fluid level and with upwardly extending sides, vertical supporting rods having their lower ends adjustably secured to the screen frame at or near the corners thereof, sleeve brackets rigidly united to the sidewalls of the tank having bores in which the supporting rods are slidably mounted, spiral springs adjustably mounted upon the supporting rods in balanced pairs comprising one spring above and one spring below each sleeve bracket, the springs being arranged to be under substantially equal compression, a drive shaft extending transversely of the tank above the screen and mounted in suitable bearings in the sides of the tank and having eccentrics mounted at opposite ends thereof, connecting rods having annular heads at their upper ends fitted to and operable by said eccentrics and with their lower ends pivotally united to the screen frame at opposite sides thereof arranged to reciprocate the screen vertically as the shaft revolves, a primary screen comprising a substantially flat wire screen of one-eighth to five-eighths inch mesh united to the screen frame at or near the lower edge thereof, a secondary screen united to the screen frame below the primary screen and comprising a wire screen of similar mesh formed into successive pockets extending transversely across the screen frame and the pockets being substantially filled with coarse heavy granular materials, the interstices of which will permit fine particles of gold, black sand or other metals to pass downwardly from the primary screen to and through the secondary screen, transverse troughs formed in the tank below the screen with semi-circular bottoms, transverse shafts mounted in the sides of the tank carrying spiral blades to convey the fines deposited in the troughs to one end of the troughs and into a suitable chamber united to the tank on the outside thereof, a discharge pipe extending into the bottom of the chamber with a manually operable valve to open or close same through which the contents of the chamber may be discharged, a sloping plate mounted in the tank at the rear of the troughs sloping downwardly to the discharge section of the tank, a transverse partition united to the sides of the tank and extending from the top thereof downwardly to a point slightly lower than the lower end of the screen and dividing the tank into a feed section and a discharge section, a discharge trough united to said partition at the water level on the feed side, a pair of spaced pulleys or drums revolvably mounted on bearings in the sides of the feed section of the tank above the water level and carrying a belt or apron with transverse bars or sweeps which extend from the lower course of the apron into the fluid just below the water level whereby the float gold or other floatable material may be carried to said discharge trough from which it may flow out by gravity, a vertical shaft revolvably mounted centrally of the discharge section of the tank carrying at its upper end a bevel gear to be driven by a corresponding bevel gear carried by a transverse shaft mounted in the sides of the tank, a plurality of propeller blades mounted upon and driven by the vertical shaft at the bottom of the discharge section whereby the sinkable grains or fragments of metal may be swept rearwardly and whereby a strong current of fluid may be caused to flow upwardly in the discharge section of the tank, an accumulator trough formed in the bottom of the tank at the rear end thereof in which the heavy grains or fragments of metal may be accumulated when carried rearwardly by the propeller blades, a conveyor mounted in the accumulator trough whereby the metal accumulated therein may be withdrawn through a suitable discharge pipe secured to the end of the tank at the end of such trough, a waste trough united to the discharge end plate of the tank at the water level into which the excess fluid may pour as raised by the propeller blades, a discharge trough mounted upon the discharge side of the partition at the water level, a pair of spaced shafts mounted on bearings in the sides of the discharge section of the tank above the water level with pulleys mounted thereon carrying a belt or apron, transverse sweeps mounted upon the belt or apron so arranged that the lower edges of the sweeps upon the lower course of the belt will extend slightly below the surface of the fluid and rake any float gold or other floatable material arising to the surface in the discharge section of the tank to the discharge trough just described, and means to drive the various shafts simultaneously.

2. A machine as described in claim 1, and means to drive the shafts at differential speeds.

3. A metal and minerals separating and classifying machine comprising a fluid-containing tank with constant fluid level, a submerged screen frame in the tank and sloping downwardly from the feed end at depths of approximately 1½ to 2½ feet below the fluid level, vertical supporting rods having their lower ends adjustably secured to the screen frame at or near the corners thereof, sleeve brackets rigidly united to the sidewalls of the tank having bores in which the supporting rods are slidably mounted, coiled compression springs adjustably mounted upon the supporting rods in balanced pairs comprising one spring above and one spring below each bracket, a primary screen comprising a substantially flat wire screen of one-eighth to five-eighths inch mesh united to the screen frame at or near the lower edge thereof, a secondary screen united to the screen frame below the primary screen and comprising a wire screen of similar mesh formed into successive pockets extending transversely across the screen frame and the pockets being substantially filled with coarse heavy granular materials, the interstices of which will permit fine particles of gold, black sand or other minerals to pass downwardly from the primary screen to and through the secondary screen, transverse troughs formed in the tank below the screen with semi-circular bottoms, transverse shafts mounted in the sides of the tank carrying spiral blades to convey the fines deposited in the troughs to one end of the troughs and into a suitable chamber united to the tank on the outside thereof, a discharge pipe extending into the bottom of the chamber with a valve to open or close same, and means to oscillate the screens vertically, and means to drive the shafts.

4. A metals and minerals separating and classifying machine comprising a fluid-containing tank with a constant fluid level, a submerged screen frame mounted in the tank and sloping downwardly from the feed end to a depth of approximately 2½ feet below the fluid level, vertical supporting rods having their lower ends adjustably secured to the screen frame at or near the corners thereof, sleeve brackets rigidly united to the sidewalls of the tank having bores in which the supporting rods are slidably mounted, coiled compression springs adjustably mounted upon the supporting rods in balanced pairs comprising one spring above and one spring below each bracket, the springs being arranged to be under substantially equal compression, a primary screen comprising a substantially flat wire screen of one-eighth to five-eighths inch mesh united to the screen frame at or near the lower edge thereof, a secondary screen united to the screen frame below the primary screen and comprising a wire screen of similar mesh formed into successive pockets extending transversely across the screen frame and the pockets being substantially filled with coarse granular materials, the interstices of which will permit fine particles of gold, black sand or other heavy minerals to pass downwardly from the primary screen to and through the secondary screen, means under the screen to catch and discharge the fines passed through the screens, and means to oscillate the screen frame vertically.

5. In a metal separating and classifying machine, a fluid-containing tank with constant fluid level, a submerged screen frame extending longitudinally in the tank and sloping downwardly from the feed end to a substantial depth, vertical supporting rods having their lower ends adjustably secured to the screen frame at or near the corners thereof, guiding means rigidly united to the sidewalls of the tank having bores in which the supporting rods are slidably mounted, balanced coiled compression springs adjustably mounted upon the supporting rods one above and one below each bracket, a primary screen united to the screen frame at or near the lower edge thereof, a secondary screen united to the screen frame below the primary screen having transverse pockets filled with coarse gravel which will permit fine particles of gold, black sand or other minerals to pass downwardly therethrough, means under the screen to catch and discharge the fines passed through the screens, means to oscillate the screens vertically, an open way from the rear of the screens to the discharge section of the tank, a transverse partition united to the sides of the tank and extending from the top thereof downwardly about to the level of the lower end of the screens and dividing the tank into a feed section and a discharge section, a vertical shaft revolvably mounted centrally of the discharge section of the tank carrying at its upper end a bevel gear to be driven by a corresponding bevel gear carried by a transverse shaft mounted in the sides of the tank, a plurality of propeller blades mounted upon and driven by the vertical shaft at the bottom of the discharge section whereby the sinkable grains or fragments of metal may be swept rearwardly and whereby a strong current of fluid may be caused to flow upwardly in the discharge section of the tank, a waste trough united to the discharge end plate of the tank at the water level into which the excess fluid may pour as raised by the propeller blades, and a discharge trough mounted upon the discharge side of the partition at the water level.

6. A machine as described in claim 5, in combination with means to rake off and discharge the flour gold and other float from the surface of the fluid in both the feed and discharge sections of the tank.

7. In a metal separating and classifying machine, the combination with a fluid-containing tank having feed and discharge sections and a constant fluid level, of a submerged screen frame in the feed section sloping downwardly from the feed end to a depth of approximately 2½ feet below the fluid level, a primary screen united to the screen frame at or near the lower edge thereof, a secondary screen united to the screen frame below the primary screen and formed into successive pockets extending transversely across the screen frame, the pockets being substantially filled with granular material, the interstices of which will permit fine particles of gold, black sand or other metals or minerals to pass downwardly from the primary screen to and through the secondary screen, means to oscillate the screens vertically, means to collect and discharge the fines from below the screens, a transverse partition united to the sides of the tank and extending from the top thereof downwardly to a point slightly lower than the lower end of the screen between the feed and discharge sections, a vertical shaft revolvably mounted centrally of the discharge section of the tank carrying a plurality of propeller blades mounted thereon at the bottom of the discharge section whereby the sinkable grains or fragments of metal may be swept rearwardly and whereby a strong current of fluid may be caused to flow upwardly in the discharge section of the tank, an accumulator trough formed in the bottom of the tank at the rear end thereof in which the heavy grains or fragments of metal may be accumulated when carried rearwardly by the propeller blades, a conveyor mounted in the accumulator trough upon a shaft mounted in the sides of the tank whereby the metal accumulated therein may be withdrawn through a suitable discharge pipe secured to the end of the tank at the end of such trough, a waste trough united to the discharge end plate of the tank at the water level into which the excess fluid and waste may pour as raised by the propeller blades, and means to drive the propeller shaft and the conveyor.

8. A metal and mineral separating machine as described in claim 7, and one or more surface rakes and discharge means to rake off and discharge flour gold and other floatable minerals from the surface of the fluid.

9. In a metal separating and classifying machine, the combination with a fluid-containing tank having feed and discharge sections, of a submerged screen frame in the feed section extending longitudinally in the tank and sloping downwardly from the feed end to a depth of approximately 2½ feet, primary and secondary screens united to the screen frame the secondary screen forming successive pockets extending transversely across the screen frame and filled with granular materials, the interstices of which will permit fine particles of gold, black sand or other metals and minerals to pass downwardly from the primary screen to and through the secondary screen, means to oscillate the screens vertically, means to collect and discharge the fines from below the screens, a transverse partition united to the sides of the tank between the feed and discharge sections and extending from the top thereof downwardly about half way to the bottom and a vertical shaft revolvably mounted centrally of the discharge section of the tank carrying a propeller at the bottom of the discharge section whereby the sinkable grains or fragments of metal may be swept rearwardly and whereby a strong current of fluid may be caused to flow upwardly in the discharge section of the tank, and means to drive the propeller shaft.

10. A combination as described in claim 9, and means for injecting water or other fluid into the feed section under the screens.

11. In a metal separating and classifying machine, the combination with a fluid-containing tank having feed and discharge sections, of a submerged screen frame in the feed section extending longitudinally in the tank and sloping downwardly from the feed end at depths of about 1½ to 2½ feet below the fluid level, a primary screen united to the screen frame, a secondary screen united to the screen frame below the primary screen and having successive pockets extending transversely across the screen frame and the pockets being substantially filled with small metal balls, small pebbles, or similar materials, means to oscillate the screens vertically, means to collect and discharge the fines from below the screens, a transverse partition between the feed and discharge sections united to the sides of the tank and extending from the top thereof downwardly to about even with the lower end of the screen, a discharge trough united to said partition at the water level, a pair of pulleys revolvably mounted in the sides of the tank above the water level and carrying a sweep whereby the float gold or other floatable material may be carried to said discharge trough, a vertical shaft revolvably mounted centrally of the discharge section of the tank, carrying a plurality of propeller blades mounted upon and driven by the vertical shaft at the bottom of the discharge section whereby the sinkable grains or fragments of metal may be swept rearwardly and whereby a strong current of fluid may be caused to flow upwardly in the discharge section of the tank, a trough and a conveyor mounted in the rear and bottom of the tank whereby the heavier metals may be withdrawn, waste discharge means united to the rear end plate of the tank at the water level out of which the waste fluid may flow as raised by the propeller blades, a trough mounted upon the discharge side of the partition at the water level, a pair of spaced shafts mounted in the sides of the discharge section of the tank above the water level with pulleys mounted thereon carrying a rake belt with transverse sweeps extending slightly below the surface of the fluid to rake any float gold or other floatable material rising to the surface in the discharge section of the tank to the trough last mentioned, and means to drive the rake belts, conveyor shafts and propeller shaft.

12. In a metal and minerals separating and classifying machine, the combination with a constant level fluid-container having interconnected feed and discharge sections in sequence, with an opening between them near their lower ends, of submerged screening means in the feed section sloping downwardly from the feed end, means to reciprocate the screening means vertically, means under the screening means to admit additional water with compressed air, means below the water admitting means to convey out of the container the heavy metal and mineral particles settling below the screening means, means to rake off the float at the surface above the screening means, means in the container separating the feed and discharge section extending downwardly approximately to the level of the lower end of the screening means, revolving means mounted in the discharge section arranged to drive the fluid and waste therein upwardly to be discharged at the water level.

13. The combination as described in claim 12, and means in the discharge section to rake off and discharge the float from the surface.

14. The combination as described in claim 12, and means in the discharge section to inject additional water at the bottom thereof.

15. In a metal separating and classifying machine the combination with a fluid-containing tank with constant fluid level of approximately 4½ feet, of feed and discharge sections, in sequence, the lower end of the feed section opening laterally into the lower end of the discharge section submerged screening means mounted in the feed section, means to oscillate the screening means vertically, resilient supporting means attached to the screening means to accelerate and amplify its oscillations, and a propeller revolvably mounted at or near the bottom of the discharge section arranged to propel the waste and fluid upwardly in the discharge section to an outlet therefrom at the fluid level.

MAURICE CONSTANT.

REFERENCES CITED

The following references are of record in the file of this patent:

UNITED STATES PATENTS

| Number | Name | Date |
|---|---|---|
| 1,910,636 | Garrett | May 23, 1933 |
| 2,196,457 | Constant | Apr. 9, 1940 |
| 2,226,170 | Lasseter | Dec. 24, 1940 |
| 1,172,634 | Savage | Feb. 22, 1916 |
| 489,797 | Faber | Jan. 10, 1893 |
| 1,074,301 | Trottier | Sept. 30, 1913 |
| 1,794,075 | Hesse | Feb. 24, 1931 |
| Re. 18,530 | Munro | July 19, 1932 |
| 918,461 | Mott | Apr. 13, 1909 |
| 2,293,978 | Janson | Aug. 25, 1942 |
| 1,910,386 | Garrett | May 23, 1933 |

FOREIGN PATENTS

| Number | Country | Date |
|---|---|---|
| 1,307 | Australia (1931) | Mar. 24, 1932 |